United States Patent [19]

Temple

[11] 4,297,780
[45] Nov. 3, 1981

[54] METHOD FOR CONNECTING SEWER PIPES TO MANHOLES OR OTHER PIPES

[76] Inventor: Lowell D. Temple, 5235 Sherrill Dr., Fort Wayne, Ind. 46806

[21] Appl. No.: 104,130

[22] Filed: Dec. 17, 1979

[51] Int. Cl.³ .............................................. B23P 11/02
[52] U.S. Cl. ...................................... 29/451; 29/235; 285/230
[58] Field of Search ...................... 29/157 R, 450, 237, 29/451, 235; 285/189, 192, 230

[56] References Cited

U.S. PATENT DOCUMENTS

| | | | |
|---|---|---|---|
| 2,737,205 | 3/1956 | Stringfield | 29/451 UX |
| 2,759,255 | 8/1956 | Prince | 29/235 X |
| 2,763,055 | 9/1956 | Hardy . | |
| 2,807,079 | 9/1957 | Josephson | 29/235 |
| 3,289,286 | 12/1966 | Belanger | 29/451 UX |
| 3,348,850 | 10/1967 | Scales | 285/230 X |
| 3,469,298 | 9/1969 | Pizzagalli | 29/237 |
| 3,787,078 | 1/1974 | Williams | 285/189 |
| 3,914,844 | 10/1975 | Norwood | 29/451 X |
| 3,958,313 | 5/1976 | Rossborough | 29/157 R |
| 3,982,777 | 9/1976 | Martin | 29/450 X |
| 4,200,299 | 4/1980 | Carlesimo | 285/189 X |
| 4,203,190 | 5/1980 | Temple et al. . | |

FOREIGN PATENT DOCUMENTS

| | | | |
|---|---|---|---|
| 803894 | 1/1969 | Canada | 285/189 |
| 224569 | 7/1910 | Fed. Rep. of Germany . | |
| 24848 | of 1909 | United Kingdom | 285/189 |
| 1337540 | 11/1973 | United Kingdom | 285/189 |

*Primary Examiner*—Charlie T. Moon
*Attorney, Agent, or Firm*—Albert L. Jeffers

[57] ABSTRACT

A method for connecting a sewer pipe to a larger pipe or manhole wherein the connection between the pipe and manhole opening is sealed by means of an elastomeric gasket or boot. A rigid ring is inserted within one end of an elastomeric boot, which has an outer diameter slightly larger than the inner diameter of the opening in the manhole. The boot is inserted into the opening up to the enlarged end, a jacking device is inserted through the gasket, and a circular, stepped plate is connected to the end of the jacking device which has been inserted through the gasket so that it is positioned to engage the end of the gasket assembly having the ring inserted therein. The jacking device includes a spider element which is braced against the outer wall of the manhole, and the device is operated such that the plate is drawn toward the spider thereby pulling the gasket and ring into the opening wherein the gasket is compressed between the opening and the rigid ring so that a compressive water-tight seal is achieved. In the disclosed embodiment of the invention, the jacking device comprises a threaded rod secured to the plate at one end and threadedly connected to a nut at the other end, which is turned by means of a ratchet device so as to draw the rod, stepped plate and gasket assembly into the opening.

12 Claims, 5 Drawing Figures

METHOD FOR CONNECTING SEWER PIPES TO MANHOLES OR OTHER PIPES

CROSS REFERENCE TO RELATED APPLICATION

The present application relates to a modification to the method for connecting sewer pipes to manholes disclosed in pending U.S. application Ser. No. 915,770 filed June 15, 1978, now U.S. Pat. No. 4,203,190, issued May 20, 1980. This application is expressly incorporated herein by reference.

BACKGROUND OF THE INVENTION

The present invention relates to a method for sealingly connecting a smaller diameter sewer pipe to a larger pipe or manhole through the use of an elastomeric gasket, and in particular to the method for inserting the gasket into the opening prior to connection of the pipe.

In order to provide watertight connections between sewer pipes and manholes, it has become common practice to employ elastomeric rubber gaskets which are compressively clamped to the pipe and to the inner surface of the manhole opening. Since the gaskets are flexible, they tolerate a considerable amount of misalignment between the pipe and opening occurring during installation or at some later time due to soil settling around the manhole or pipe.

One such gasket is disclosed in U.S. Pat. No. 3,787,078 and comprises an elastomeric ring having resilient flexible flanges which provide a fluid-tight seal when pressed into a tapered opening in the manhole. The sewer pipe, which is equipped with such a ring or gasket, is crowded into the tapered passage so that the flanges deflect to engage the walls of the passage and provide a seal.

Another prior art gasket is disclosed in U.S. Pat. No. 3,958,313 and comprises a flexible boot having an external contracting clamp on one end for clamping the gasket to a sewer pipe or the like, and an internal expanding clamp on the opposite end. To connect the boot to the manhole opening, the boot is located within the opening with the internal clamp in its non-expanded state, and an over-center toggle mechanism is then locked to expand the clamp so as to compress the boot between it and the internal surface of the opening. One disadvantage to this last device is that there is always the possibility of failure of the toggle mechanism resulting from corrosion or chemical attack caused by the effluent carried by the pipe or by environmental conditions. Furthermore, shifting of the pipe or manhole during installation or subsequently through shifting of the supporting ground may cause unlocking of the toggle mechanism. Obviously, this would result in loss of the seal between the gasket and opening thereby causing leakage.

In the method disclosed in the aforementioned application Ser. No. 915,770, there is provided an elastomeric annular gasket which has an outer diameter slightly larger than the inner diameter of the manhole opening and includes a one-piece ring received therein. The gasket and ring assembly is pressed into the opening by means of a jack so as to compress the gasket between the opening and the annular ring thereby establishing a watertight seal between the gasket and opening. The sewer pipe is then connected to the other end of the gasket by means of a standard compressive clamp.

The jacking mechanism utilized to press the gasket and ring assembly into the opening is of the extensible type. The jacking mechanism is braced against the wall of the manhole directly opposite the opening, and is then extended so as to press the gasket and ring assembly into the opening. Difficulty arises when the manhole is of a size or shape which does not easily accommodate the jack, or where the person who must operate the jack cannot easily fit into the manhole. This would be the case where one sewer pipe is connected to another sewer pipe which, although of a larger diameter, is still not sufficiently large to accommodate the entry of a workman for the purpose of operating the extensible jack.

SUMMARY OF THE INVENTION

The present invention relates to an improved method for connecting the gasket to a manhole or pipe opening wherein the jacking force is applied between the gasket assembly and the exterior of the manhole rather than between the gasket assembly and the interior of the manhole as in the aforementioned application Ser. No. 915,770. This greatly facilitates insertion of the gasket in manholes or pipes which are dimensioned such that access to the interiors thereof is limited. Furthermore, it is not necessary for the jacking device to be capable of extending over a very wide range of manhole diameters, as is the case with the previous method, because it is merely necessary for the jack to be extended to a distance sufficient to engage the gasket assembly within the manhole and then pull it outwardly into the opening.

Specifically, the present invention contemplates a method of connecting a gasket to a pipe, manhole or the like having a wall with an inner surface and an outer surface and an opening extending through the wall. The method comprises the steps of providing an elastomeric gasket assembly including a gasket, one end of which is annular and has an outer diameter larger than the inner diameter of the manhole or pipe opening, and an annular, substantially rigid ring received in the annular end of the gasket member; positioning the annular end of the assembly over the opening adjacent either the inner or outer surface of the manhole or pipe; positioning a jack with a first part thereof engaging the annular end of the gasket assembly and a second part braced against the opposite surface of the manhole or pipe; and operating the jack to pull the gasket assembly into the opening wherein the gasket annular end is tightly compressed between the opening and ring so as to provide a watertight seal.

The jack extends through the gasket and opening and engages the annular end of the gasket assembly, and when the jack is operated by progressively shortening the distance between the first and second parts, the gasket assembly is drawn into the opening. The pipe which is to be attached to the manhole or the like is then clamped to the other end of the elastomeric gasket by means of a conventional clamp.

It is an object of the present invention to provide a method for sealingly connecting a sewer pipe to a manhole or the like wherein the use of permanently installed devices having moving mechanical parts is avoided.

A further object of the present invention is to provide a method for sealingly connecting a gasket to a manhole or the like wherein the gasket is pulled into the opening by means of jacking forces exerted between the gasket assembly and the surface of the manhole or the like on the opposite side of the opening.

These and other objects and features of the present invention will become apparent from the detailed description of the invention considered together with the drawings.

DETAILED DESCRIPTION

Figure 1:
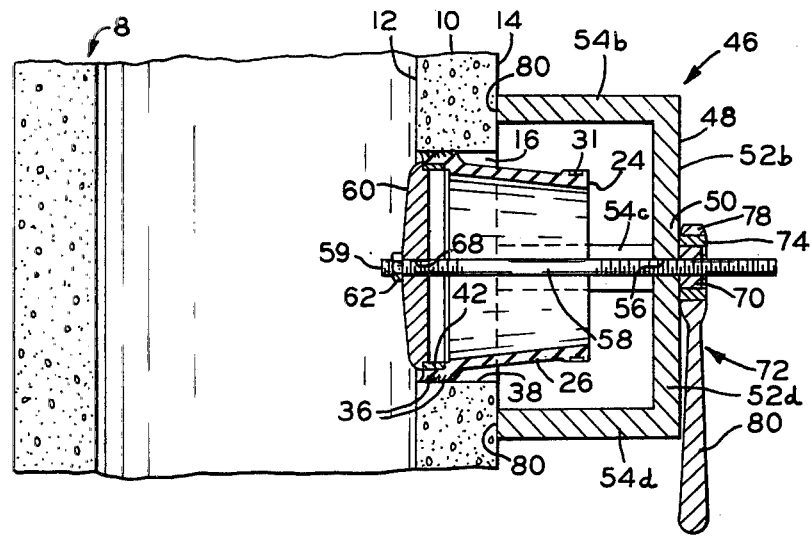
FIG. 1 is a sectional view showing the gasket assembly being pulled into the manhole opening by a jacking device in accordance with the method of the present invention.

With reference now to the drawings, FIG. 1 illustrates a manhole 8, which includes a cylindrical wall 10 having an inner surface 12 and an outer surface 14. Manhole 8 is generally made of concrete and has a circular opening 16 bored or cast therein. Although the present invention will be described in connection with a manhole which is sufficiently large to accommodate a workman therein, it is also applicable to sewer pipes which have much smaller diameters. Thus, another sewer pipe could be substituted for manhole 8 in the drawings and subsequent description, and the present invention is intended to cover both applications of the method.

Figure 3:
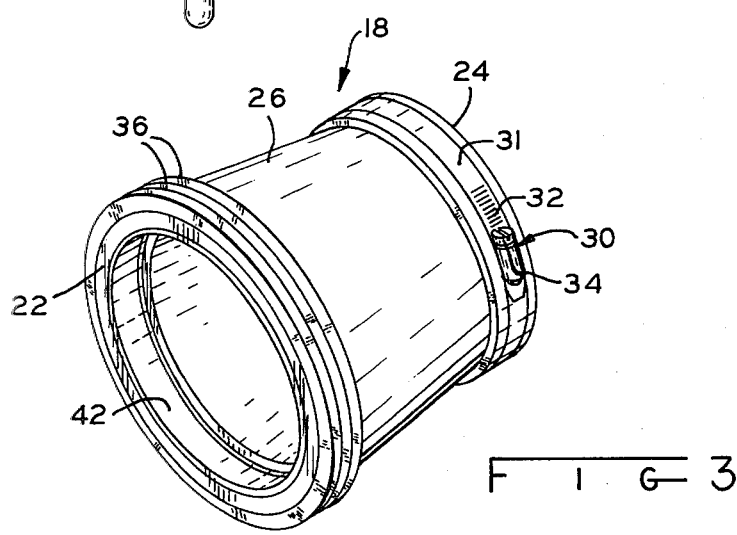
FIG. 3 is an enlarged perspective view of the gasket assembly employed in the method according to the present invention.
Figure 4:
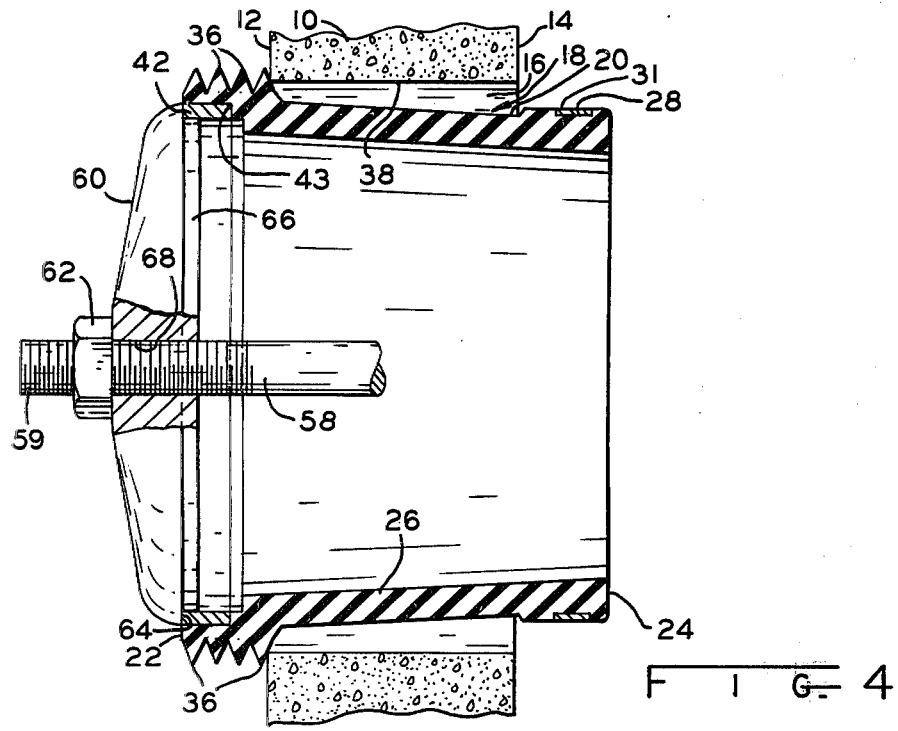
FIG. 4 is an enlarged fragmentary longitudinal sectional view of the jack and gasket assembly of FIG. 3.
Figure 5:
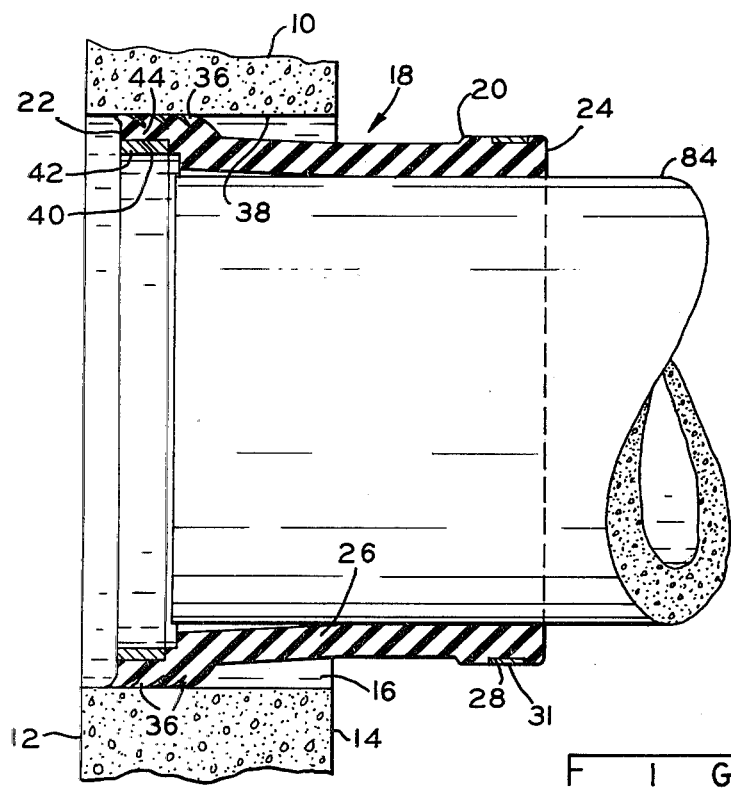
FIG. 5 is an enlarged sectional view showing the gasket assembly of FIG. 4 inserted within the manhole opening.

The gasket assembly 18, which is illustrated in detail in FIGS. 3, 4 and 5, includes a gasket 20 made of an elastomeric material, such as neoprene or other rubber-like material. Gasket 20 comprises a larger diameter annular portion 22 at one end, a smaller diameter annular portion 24 at the other end, and a frustoconical portion 26 therebetween. The smaller diameter end 24 is provided with an annular groove 28 within which pipe clamp 30 is received. Clamp 30 is shown as a screw-type clamp having a steel band 31 with teeth 32, which are engaged by the threads (not shown) of screw 34. As screw 34 is turned, band 31 will tighten on itself.

The larger diameter end 22 is provided with ribs 36 which deform when compressed (FIG. 5) so as to conform to the irregularities of the surface 38 of opening 16. Larger diameter end 22 also includes an annular step 40 within which a substantially rigid, steel ring 42 is inserted and seated against shoulder 43. The inner diameter of step 40 may be slightly smaller than the outer diameter of ring 42 so that a moderately tight fit is achieved. The outer diameter of end 22 of gasket 18 is larger than the inner diameter of opening 16 so that when the gasket is inserted within opening 16, that portion 44 of gasket 20 located between ring 42 and the inner surface 38 of opening 16 will be tightly compressed thereby forming the desired seal. For example, the ribbed portion 44 of gasket 20 may have an outer diameter of $10\frac{3}{8}$ inches, the ring 42 an outer diameter of $9\frac{5}{8}$ inches, and the opening 16 an inner diameter of 10 inches.

The jacking device 46 for pressing the gasket assembly 18 into opening 16 comprises a steel or cast iron spider 48 including a hub portion 50, four laterally extending legs 52a, 52b, 52c and 52d disposed at right angles to each other and integral with hub portion 50, and four legs 54a, 54b, 54c and 54d integral with and disposed at right angles to their respective legs 52a–52d. When spider 48 is designed to be used with a manhole 8 having a particular outer diameter, legs 54a and 54c will be slightly longer than legs 54b and 54d so that all four legs 54a–54d will seat firmly against the outer surface 14 of the manhole 8 when jacking force is exerted. Alternatively, spider 48 could be constructed such that legs 54a and 54c would be adjustable in length (not shown).

Extending through an opening 56 in the hub portion 50 of spider 48 is a threaded rod 58, which has received over the end 59 thereof a circular plate 60 and a nut 62, the latter being threadedly secured to rod 58 (FIG. 4). Plate 60 has an annular step or shoulder 64 therein, which is dimensioned to seat on ring 42 and forms a smaller diameter portion 66 that fits within ring 42 and assists in centering the plate 60 with respect to ring 42. Rod 58 is loosely received within opening 68 in the center of plate 60, and plate 60 is captured by means of nut 62 threadedly secured to rod 58.

A second nut 70 is threaded onto the other end of rod 58 and is turned by means of an open ended ratchet wrench 72. Wrench 72 includes a socket portion 74 having a hexagonally shaped inner surface 76 adapted to engage the nut 70, and a housing portion 78, which is connected to socket 74 by means of a well-known ratchet assembly that positively interlocks the socket 74 and housing 78 when housing 78 is turned in one direction by handle 80, and permits the housing 78 to slip relative to socket 74 when turned in the opposite direction by handle 80. Ratchet wrenches of this type are well-known and sold by many tool manufacturers and distributors, such as Sears Roebuck & Company.

In order to insert the gasket assembly 18, ring 42 is inserted within the annular step 40 in the end 22 of gasket 20, and gasket 20 is inserted into opening 16 until the ribs 34 are just adjacent the inner surface 12 of manhole 8, as shown in FIG. 4. Rod 58 is then extended through the center of gasket 20 and through the central opening 68 in plate 60, the latter being positioned just over the end of gasket assembly 18 including ring 42. Nut 62 is threaded onto rod 58 to hold plate 60 to rod 58 when jacking force is exerted.

Figure 2:
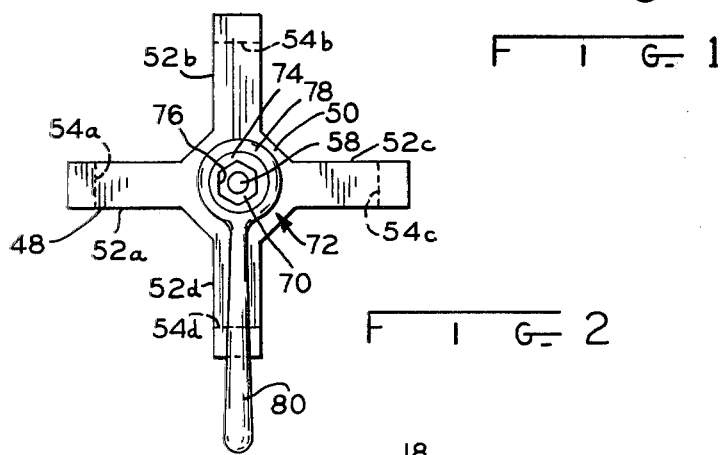
FIG. 2 is an end view of a portion of the jacking device.

The spider 48 is slipped over rod 58, and the bottoms 80 of feet 54a, 54b, 54c and 54d are braced against the outer surface 14 of manhole 8. Nut 70 is then threaded on the outer end of rod 58 until it abuts hub portion 50 of spider 48. Wrench 72 is then inserted over nut 70 and turned in the clockwise direction, as viewed in FIG. 2, thereby pulling rod 58 rearwardly through spider 48. Since plate 60 is connected to rod 58 by nut 62, it will engage ring 42 and possibly the end 22 of gasket 20 and pull the gasket assembly 18 into opening 16 whereupon the portion 44 of gasket 20 between ring 42 and the inner surface 38 of opening 16 is compressed so as to form a watertight seal. If desired, a lock nut (not shown) may be tightened against nut 62 if rod 58 tends to turn relative to nut 62 as it is being pulled outwardly by the rotation of nut 70.

When gasket assembly 18 has been pulled in opening 16 to the desired extent, plate 60 is released from rod 58 by unscrewing nut 62, and the jacking device 46 can then be removed. Sewer pipe 84 is inserted within gasket 20 and clamped in place by tightening clamp 30, which establishes a watertight connection between gasket 20 and pipe 84.

Although a specific jacking device has been disclosed, the present invention is not limited to the particular apparatus used. For example, a hydraulic jack or a ratchet-type jack could be utilized to draw plate 60 against ring 42. Furthermore, plate 60 could be replaced by a spider arrangement having a plurality of latterly extending arms which engage ring 42.

The advantage in utilizing a jack to draw gasket assembly in place is that the interference fit between the gasket 20 and opening 16 can be much greater. This results in much greater compression of the gasket so that the seal is improved and dislodgement of the gasket assembly is not as likely after installation.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. The method of connecting a gasket to a pipe, manhole, or the like having a wall with an inner surface and an outer surface and an opening extending through the wall comprising:
   providing an elastomeric gasket assembly comprising a gasket, one end of which is annular and has an outer diameter larger than the inner diameter of the manhole or pipe opening, and an annular substantially rigid ring received in the annular end of the gasket member,
   positioning the annular end of the assembly over the opening adjacent one of the inner and outer surfaces,
   positioning a jack with a first part thereof engaging the annular end of the gasket assembly and a second part braced against the other of the inner and outer surfaces, and
   operating the jack to pull the gasket assembly into the opening wherein the gasket annular end is tightly compressed between the opening and ring.

2. The method of claim 1 including the step of connecting a pipe to the other end of the gasket.

3. The method of claim 2 wherein the other end of the gasket is clamped around the second mentioned pipe.

4. The method of claim 1 wherein the jack extends through the gasket, and when the jack is operated, the first part is drawn toward the second part.

5. The method of claim 4 wherein the first part is connected to the second part by means of a threaded rod which extends through the gasket, and wherein the first and second parts are drawn together by causing relative rotation between the rod and a nut device threadedly connected to the rod.

6. The method of claim 5 wherein the first part comprises a generally circular plate having an annular shoulder thereon which is dimensioned to seat against the ring as the gasket assembly is pulled into the opening.

7. The method of claim 5 wherein the jack comprises a ratchet wrench which turns the nut device threadedly connected to the rod, and a second part comprises a spider through which the rod passes, the spider being interposed between the nut and the gasket.

8. The method of claim 1 wherein the ring is seated against a shoulder in the gasket.

9. The method of connecting a gasket to a pipe, manhole, or the like having a wall with an inner surface and an outer surface and an opening extending therethrough comprising:
   providing an elastomeric gasket assembly comprising a gasket, one end of which is annular and has an outer diameter larger than the inner diameter of the manhole or pipe opening, and an annular substantially rigid ring received in the annular end of the gasket member,
   positioning the annular end of the assembly over the opening adjacent one of the inner and outer surfaces,
   pulling the gasket assembly into the opening by means of an element extending through the gasket and opening and engaging the annular end of the gasket assembly, wherein when the element is pulled, the gasket assembly is pulled into the opening by it, and the gasket annular end is tightly compressed between the opening and ring.

10. The method of claim 9 wherein, the gasket assembly is positioned over the opening adjacent one of the inner or outer surfaces, and the element is part of a jack assembly bracing against the other of the inner or outer surfaces.

11. The method of claim 10 wherein the jack includes a stepped plate which engages the annular end of the gasket assembly.

12. The method of claim 9 including the step of clamping a pipe to an end of the gasket opposite the said annular end.

* * * * *